Dec. 30, 1969
S. CLOSE
3,486,626
REPLACEABLE MEDIUM, EXTENDED AREA FILTER UNIT
Filed Feb. 1, 1968
3 Sheets-Sheet 1
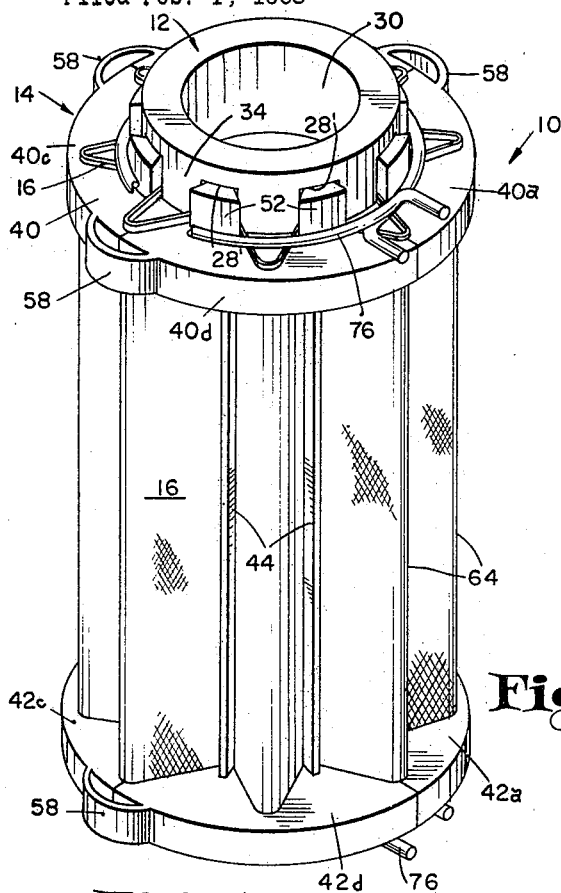
Fig. 1
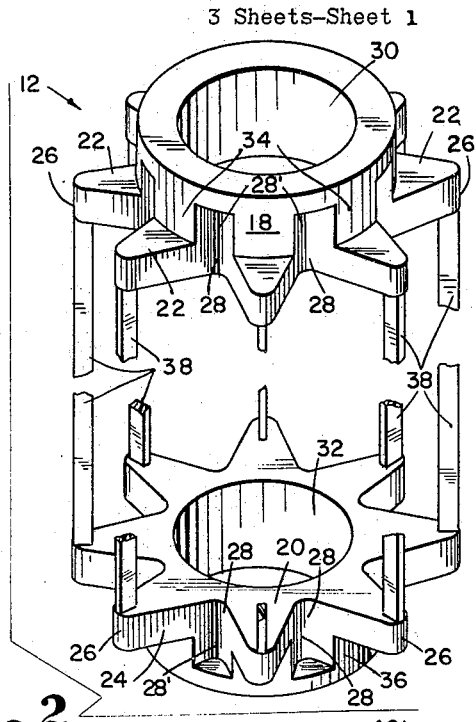
Fig. 2
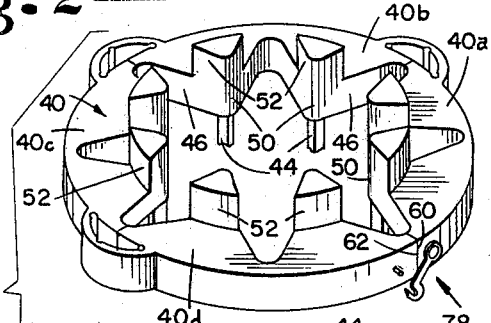
Fig. 3
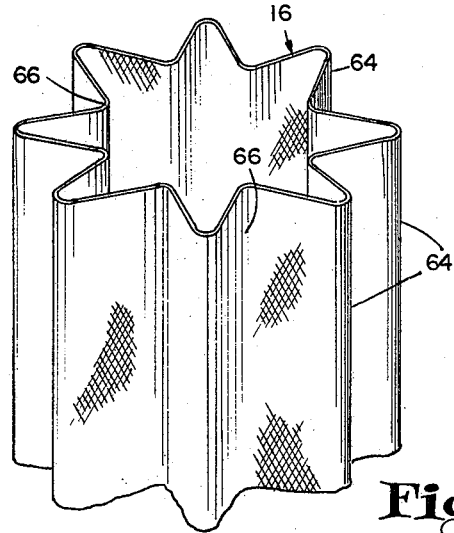
Fig. 4
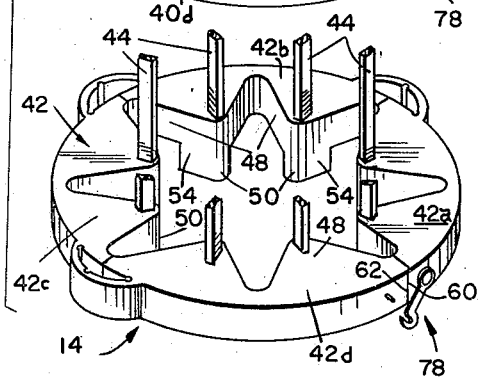
INVENTOR
SAM CLOSE
BY
Hood Gust & Irish
ATTORNEYS

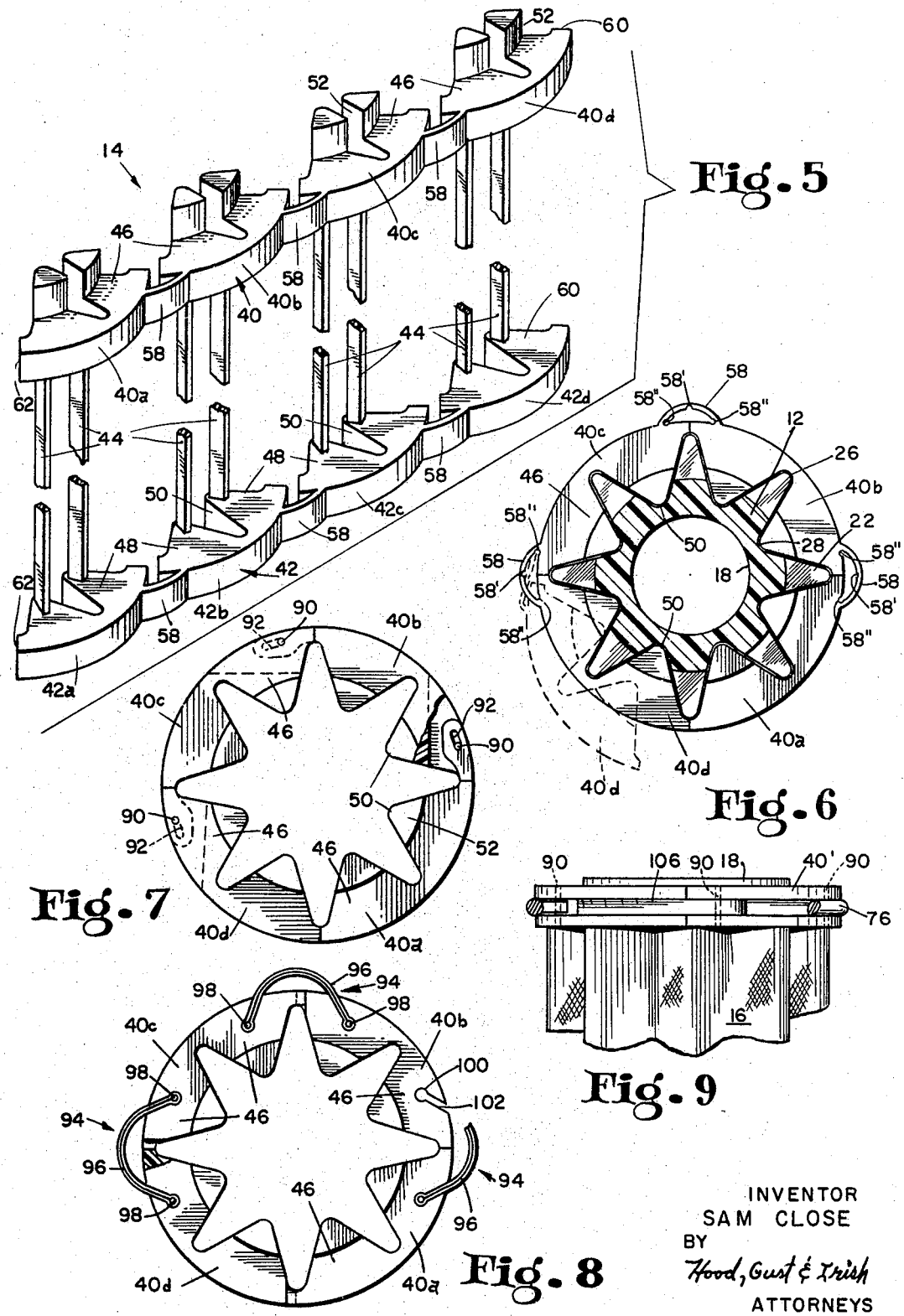

Dec. 30, 1969   S. CLOSE   3,486,626
REPLACEABLE MEDIUM, EXTENDED AREA FILTER UNIT
Filed Feb. 1, 1968   3 Sheets-Sheet 3

INVENTORS
SAM CLOSE
BY
Hood, Gust & Irish
ATTORNEYS

United States Patent Office 3,486,626
Patented Dec. 30, 1969

3,486,626
REPLACEABLE MEDIUM, EXTENDED AREA
FILTER UNIT
Sam Close, R.R. 5, Lebanon, Ind. 46052
Filed Feb. 1, 1968, Ser. No. 702,436
Int. Cl. B01d 25/04, 25/00
U.S. Cl. 210—232                               21 Claims

ABSTRACT OF THE DISCLOSURE

A filter unit comprising a sleeve-shaped, fluid pervious filter element, support means comprising, at each end of the filter element, a plurality of outwardly extending cogs spaced about the perimeter thereof and engaging the inner surface of the filter element and means for releasably clamping the filter element to the support means. The clamping means comprises, at each end of the filter element, a plurality of inwardly extending cogs proportioned and designed to mesh with the outwardly extending cogs, the inwardly extending cogs engaging the outer surface of the filter element so that, when the cogs are meshed, the filter element is drawn tautly about the contours of the outwardly extending cogs. Preferably, the support means comprises, at each end of the filter element, a generally cylindrical member providing the outwardly extending cogs, the members being identical and allochirally arranged so that, when the filter element is clamped thereto, it is formed with a plurality of longitudinally extending ridges, the contour of each ridge being identical to the contour of the outwardly extending cogs about which the ridge is formed. Also, preferably, the clamping means comprises, at each end of the filter element, a clamping head comprising a plurality of segments providing the inwardly extending cogs and means for hingedly connecting adjacent segments whereby the clamping heads can be closed peripherally to engage the support means and opened to disengage the support means.

---

The primary object of my invention is to provide a replaceable medium, extended area filter unit which is simple in construction and, yet, effective for the purpose intended.

Another object of my invention is to provide such a filter unit which is usable in a wide variety of applications, the only requirement being that the porosity and character of the filter element be determined by the medium being filtered.

Still another object of my invention is to provide such a filter unit comprising a sleeve-shaped, fluid pervious filter element, support means disposed inside the filter element and comprising, at each end of the filter element, a plurality of outwardly extending cogs spaced about the perimeter thereof and engaging the inner surface of the filter element and means for releasably clamping the filter element to the support means, the clamping means comprising, at each end of the filter element, a plurality of inwardly extending cogs proportioned and designed to mesh with the outwardly extending cogs and to engage the outer surface of the filter element so that, when the cogs are meshed, the filter element is drawn tautly about the contour of the outwardly extending cogs.

A further object of my invention is to provide such a clamping means comprising, at each end of the filter element, a clamping head comprising a plurality of segments providing the inwardly extending cogs and means for hingedly connecting adjacent segments whereby the clamping heads can be closed peripherally to engage the support means and opened to disengage the support means.

Further objects of this invention will appear as the description proceeds.

To the accomplishment of the above and related objects, my invention may be embodied in the forms illustrated in the accompanying drawings, attention being called to the fact, however, that the drawings are illustrative only and that change may be made in the specific constructions illustrated and described.

In the drawings:

FIG. 1 is a perspective view of a preferred embodiment of my filter unit;

FIG. 2 is a perspective view, shortened in height, of a preferred core element of my filter unit;

FIG. 3 is a perspective view, also shortened in height, of my preferred clamping means;

FIG. 4 is a fragmentary, perspective view of one type of filter element usable in my unit;

FIG. 5 is a perspective view, shortened in height, of the clamping means of FIG. 3, the clamping means being shown in its open condition;

FIG. 6 is a transverse sectional view of the filter unit of FIG. 1;

FIG. 7 is a top view of another clamping means, this view showing a pin arrangement for hingedly connecting the segments of the clamping means;

FIG. 8 is a top view of still another clamping means, this view showing strap means for hingedly connecting the segments of the clamping means;

FIG. 9 is a fragmentary, elevation view of still another embodiment of my filter unit, this view showing a different position for the resilient annulus which holds the clamping means in peripheral engagement with the filter element;

Figure 10:
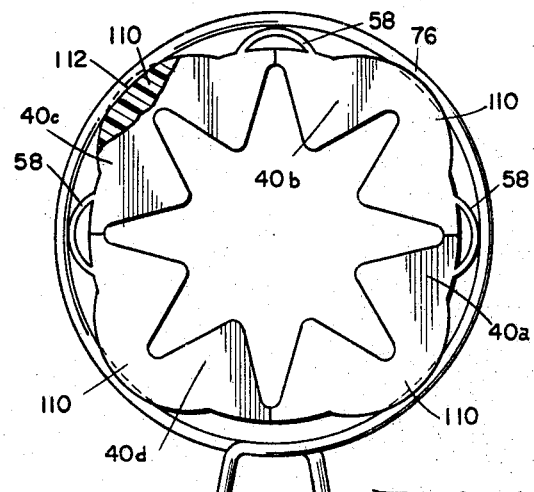
FIG. 10 is a top view, partially sectioned, of still another embodiment of my filter unit, this view showing still another position for the resilient annulus which holds the clamping means in peripheral engagement with the filter element.

Referring now to the drawings, and particularly to FIGS. 1 through 5, it will be seen that I have illustrated a filter unit, indicated generally by the reference numeral 10, comprising a core element 12 (clearly shown in FIG. 2), a clamp 14 (clearly shown in FIGS. 3 and 5) and a filter element 16 (FIG. 4). The filter element 16 is so proportioned and designed that, when it is sleeved over the core element 12, it can assume its illustrated corrugated shape. The filter element 16 may be fabricated from any material suitable for filtering a particular medium. My filter unit is not limited to any particular application and, consequently, it is not necessary to describe a particular material from which the filter element 16 may be fabricated.

The core element 12, which internally supports the filter element 16, comprises, at each of its ends, a generally cylindrical member 18, 20 providing a plurality of radially outwardly extending, angularly equally spaced cogs 22, 24 the members 18, 20 being identical and allochirally arranged. Each member 18, 20 is, therefore, in the shape of a cog wheel with the radially outer tip 26 of each cog 22, 24 being rounded and smooth as illustrated and with the sockets 28 between the cogs 22, 24 also being rounded and smooth as illustrated. This preferred contour is best shown by the sectional view of the member 18 in FIG. 6.

In the illustrative embodiment, each member 18, 20 is provided with an axially extending, centrally located opening 30, 32 through which material is either admitted to or removed from the filter unit 10. It will be understood that such openings 30, 32 are merely illustrative and that in some embodiments there may be only one opening 30, 32.

Further, in the illustrative embodiment, each member 18, 20 is formed to provide an axially extending collar portion 34, 36 each collar portion 34, 36 being provided with a plurality of radially spaced sockets 28', each of which is in axial alignment with a socket 28. The purpose of the sockets 28' will be discussed hereinafter.

Further, in the illustrative embodiment of FIG. 2, the members 18, 20 are connected by a plurality of axially extending, substantially rigid posts 38, each of which extends between the outermost portions of an aligned pair of cogs 22 and 24. The radially outer edge of each post 38 is preferably generally coincident with the tip 26 of the cogs 22, 24 between which the post extends.

The core element 12 may be fabricated by integrally molding all of the structure shown in FIG. 2, or alternatively, by molding or forming the various portions of the structure and then, in a suitable manner, connecting the portions together. It will be appreciated that the core element 12 may be economically fabricated by molding the entire element out of a suitable plastic material, such as a polypropylene plastic material.

Referring to FIGS. 3 and 5, it will be seen that my preferred clamp 14 comprises, at each of its ends, a clamping head 40, 42, said heads being connected together by a plurality of axially extending ribs 44. Each clamping head 40, 42 provides, when it is in its closed condition shown in FIG. 3, a plurality of radially inwardly extending, angularly equally spaced cogs 46, 48 proportioned and designed to mesh, respectively, with the cogs 22, 24. In its closed condition, each clamping head 40, 42 is substantially in the shape of an internal ring gear, the contour of the cogs 46, 48 of which is proportioned and designed snugly to engage the cogs 22, 24 of the members 18, 20. This mating engagement of the cogs 46, 48 with the cogs 22, 24 is best shown in FIG. 6.

Each rib 44 extends between an aligned pair of cogs 46, 48, the radially inner edge of each rib 44 being generally coincident with the tips 50 of the cogs 46, 48 between which the rib extends. It will be seen that, when the clamp 14 is wrapped peripherally about the core element 12, the ribs 44 will be disposed radially inwardly of the posts 38. Also, since the members 18 and 20 are preferably identical and allochirally arranged, the posts 38 and the ribs 44 will be generally parallel.

In the illustrative embodiment, each inwardly extending cog 46, 48 is provided with an axially extending portion 52, 54, the radially outer surfaces of which define, when the clamp 14 is closed, a common cylindrical surface disposed radially outwardly beyond the outer surface of the collar 18 or 20. When the clamp 14 is closed about the core element 12, each extension portion 52, 54 is received in a socket 28' of the core element 12. This arrangement is best illustrated at the top portion of FIG. 1.

As clearly shown in FIG. 5, each clamping head 40, 42 comprises a plurality of segments 40a, 40b, 40c, 40d, 42a, 42b, 42c, 42d, the segments providing the inwardly extending cogs 46, 48. In the illustrative embodiment, each such segment provides two inwardly extending cogs 46, 48 and each aligned pair of segments is connected by two of the ribs 44.

Adjacent segments 40a, 40b, 40c, 40d, 42a, 42b, 42c, 42d are hingedly connected by means of relatively thin, flexible webs 58 which are preferably integrally formed with the segments. Specifically, I prefer to fabricate the entire clamp 14 by integrally molding all of the portions thereof from a suitable plastic material, such as polypropylene, so that the clamp can be wrapped peripherally about the core element 12 peripherally to engage the filter element 16.

The preferred web 58 structure is shown in FIG. 6. Referring to FIG. 6, it will be seen that each web is formed with a reduced portion 58' in its center and a reduced portion 58'' at each of its ends. The reduced portions 58', 58'' determine the points of greatest flexibility for each web. Further, the reduced portions 58'' act to relieve the flexure stress at the ends of the webs 58.

Preferably, the clamp 14 is formed so that, when the flat surfaces 60, 62 of its free ends are brought together, the clamp 14 will be generally cylindrical. In the illustrative embodiment, each segment 40a, 40b, 40c, 40d, 42a, 42b, 42c, 42d is a 90° segment of such a cylinder.

When a filter element 16 is sleeved over the core element 12 and a clamp 14 is wrapped peripherally about the outer surface of the filter element, the filter element will assume the corrugated shape illustrated in FIG. 4, i.e., the filter element 16 will have the illustrated longitudinally extending ridges 64 alternating with the grooves 66. Each ridge 64 will have a contour identical to the cogs 22, 24 about which the ridge is formed and each groove 66 will have a contour identical to the cogs 46, 48 about which the groove is formed. Similarly, each ridge 64 will be disposed about a post 38 and each groove 66 will be disposed about a rib 44. Preferably, the filter element 16 will be proportioned and designed so that, when the filter element is clamped onto the core element 12 by the clamp 14, the filter element will be drawn peripherally taut. That is, the filter element 16 will be drawn tightly over the tips 26 and posts 38 and forced by the tips 50 and ribs 44 into the sockets 28. The filter element will thus be held axially tautly by the clamp 14.

Figure 11:
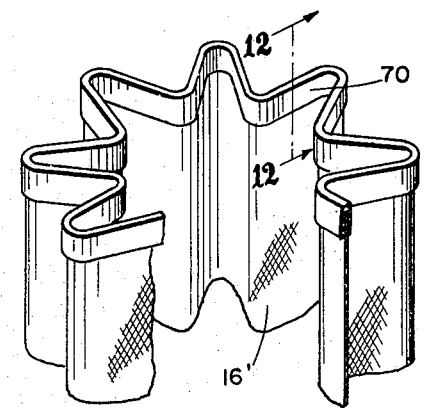
FIG. 11 is a fragmentary, perspective view of a filter element showing its end portion impregnated with a rubberoid material.
Figure 12:
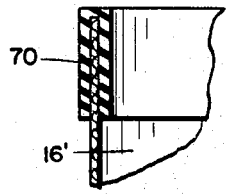
FIG. 12 is a fragmentary, sectional view, enlarged and somewhat exaggerated, showing the rubberoid material impregnating the end portion of the filter element.
Figure 13:
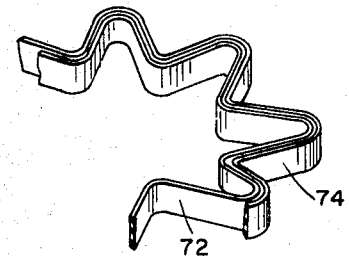
FIG. 13 is a fragmentary, perspective view of mating gaskets which may be disposed at each of the filter element.

In one embodiment of my invention, I treat the end portions of the filter element 16' with a rubberoid material 70 (FIGS. 11 and 12) which facilitates the gripping of the filter element by the cogs 22, 24, 46, 48. Preferably, this rubberoid material will be formed on the filter element 16 in such a manner that it will impregnate the pores of the filter element, and be secured thereto. This rubberoid material 70, therefore, serves as a gasket permitting a substantially fluid-tight seal about the contour of the cogs 22, 24.

In still another embodiment of my invention, gaskets 72, 74 will be provided at each end of the filter element 16, the gaskets 72 being disposed in contact with the inside surface of the filter element 16 and the gasket 74 being disposed in contact with the outside surface of the filter element 16. These gaskets 72, 74, will serve the same function as the above-described rubberoid material 70.

Preferably, resilent means is provided for holding the clamp 14 in its closed position about core element 12. In the illustrative embodiments, this resilient means comprises a pair of conventional spring wire clamps 76 which engage the outer surfaces of the extension portions 52, 54 as shown in FIG. 1. Such clamps 76, if properly designed, will urge the cogs 46, 48 radially inwardly to hold the filter element 16.

In another embodiment of my invention, the clamp 14 may be held in its closed condition by latch means such as that indicated by the reference numeral 78 (FIG. 3) cooperatively carried at the free ends (adjacent the free end surfaces 60, 62) of the clamping heads 40, 42. Such latch means are conventional and need not be discussed, in detail, in this description.

Figure 14:
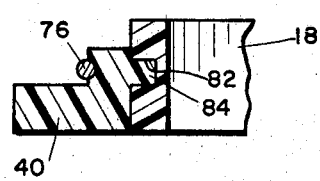
FIG. 14 is a fragmentary, sectional view showing one means for restraining a clamping head from axial movement relative to the core element.
Figure 15:
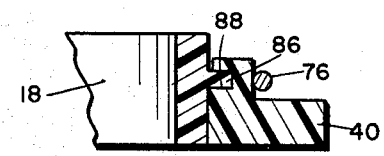
FIG. 15 is a fragmentary, sectional view showing another means for restraining a clamping head from movement axially relative to the core element.

In some instances, it may be desirable to construct a filter unit without the longitudinally extending posts 38 and ribs 44 connecting, respectively, the members 18, 20 and the clamping heads 40, 42. In such a case, it will be necessary to provide means for preventing the clamping heads 40, 42 from moving axially relative to the members 18, 20. Such means are shown in FIGS. 14 and 15. In FIG. 14, I show the member 18 formed with a peripherally extending groove 82 and the clamping head 40 provided with a radially inwardly and peripherally extending tenon means 84 proportioned and designed to be received snugly in the groove 82. FIG. 14 is a sectional view through only one of the segments comprising the clamping head 40 and it will be understood that each of the segments is preferably provided with a section of the tenon means 84. The spring wire clamp 76 will tend to hold the tenon means 84 in the groove 82.

In FIG. 15, I show a peripherally and radially outwardly extending tenon 86 on the member 18 and a peripherally extending groove 88 in the inner surface of the clamping head 40. The tenon 86 is proportioned and designed snugly to engage the groove 88 to prevent movement of the clamping head 40 or any of its segments axially relative to the member 18. Again, the clamp 76 will tend to hold the tenon 86 in the groove 88.

In some instances, it may be desirable not to mold integrally the segments of the clamping heads 40, 42, with the interconnecting webs 58. In such a case, it will be necessary to provide means other than the webs 58 for hingedly connecting the segments 40a, 40b, 40c, 42a, 42b, 42c, 42d. Two such means are shown in FIGS. 7 and 8.

In FIG. 7, it will be seen that, for example, the segment 40a, is hingedly connected to the segment 40b by means of a pin 90 which is carried on the segment 40b and which extends through an elongated slot 92 in the segment 40a. This elongated slot 92 permits the segment 40a to move pivotally about the axis of the pin 90 and, within the limits of the slot 92, transaxially relative to the pin 90, such transaxial movement being required to permit engagement of the cogs 46 on the segment 40a with their respective cogs 22. If the slot 92 were not elongated and the segments 40a could only pivot about the axis of the pin 90, when the cogs 46 of the segment 40b are fully engaged with their respective cogs 22, the tips 50 of the cogs 46 on the segment 40a would not clear the tips 26 of the cogs 22. The segment 40b is hingedly connected to the segment 40c and the segment 40c is hingedly connected to the segment 40d by such pin means.

In FIG. 8, I show strap means 94 connecting adjacent segments 40a, 40b, 40c, 40d. Each strap means 94 functions in the manner as the above-described webs 58. In the embodiment of FIG. 8, each strap means 94 comprises a closed loop 96 of flexible material, which loop is trained about a pin 98 on each of two adjacent segments 40a, 40b, 40c, 40d. Each pin 98 is received in a cylindrical cutout 100 which is just large enough to permit the loop 96 to be slipped down over the pin. The portion of the loop 96 leading away from the pin 98 is received in a trough 102 leading from the cutout 100 to the outer peripheral surface of the segment. Each loop 96 is sufficiently long and flexible to permit slight separation of the pins 98 when the cogs 46 are being meshed with their respective cogs 22. That is, the length and flexibility of the loops 96 is provided for the same reason that the above-described elongated slots 92 are provided.

Referring now to FIG. 9, it will be seen that I have illustrated the spring wire clamp 76 peripherally engaging a clamping head 40′ in a plane which cuts through the hinge means connecting the segments of the clamping head. Preferably, the spring wire clamp 76 is received in a peripherally extending groove 106 in the clamping head 40′. The clamping head 40′ is substantially similar to the above-described clamping head 40 except that the extension portions 52 are eliminated. The arrangement of FIG. 9 will, therefore, permit shortening of the overall length of the filter unit 10 by eliminating the extension portions 52, 54 and the collar portions 34, 36.

Referring now to FIG. 10, it will be seen that I have illustrated a radially outwardly extending portion 110 on each of the segments 40a, 40b, 40c, 40d, and that I engage these portions with the spring wire clamp 76. In the embodiment of FIG. 10, the clamp 76 is thus disposed radially outwardly beyond the webs 58 hingedly connecting the segments of the clamping head 40, the clamp 76 lying in a plane which cuts through each of the webs 58. Preferably, each portion 110 is formed with a groove such as indicated at 112 for receiving the clamp 76. Thus, in the embodiment of FIG. 10, there is no need for the extension portions 52, 54 and the overall height of the filter unit can be reduced by elimination of such portions.

What is claimed is:

1. A filter apparatus comprising a sleeve-shaped, fluid-pervious filter element, support means comprising, for each end of said filter element, a member providing a plurality of outwardly extending cogs spaced about the perimeter thereof and engaging the inner surface of said element, means for releasably clamping said filter element to said support means, said clamping means comprising, for each end of said filter element, a head providing a plurality of inwardly extending cogs proportioned and designed to mesh with said outwardly extending cogs, and said inwardly extending cogs engaging the outer surface of said filter element so that, when said cogs are meshed, said filter element is drawn tautly about the contour of said outwardly extending cogs.

2. A filter apparatus as in claim 1 wherein said members are identical and allochirally arranged so that, when said filter element is clamped thereto, the filter element is formed with a plurality of longitudinally extending ridges, the contour of each ridge being identical to the contour of the outwardly extending cogs about which the ridge is formed.

3. A filter apparatus as in claim 2 wherein said support means further comprises a substantially rigid post extending axially between the outermost portions of each aligned pair of said outwardly extending cogs whereby each of said ridges is formed about one of said posts.

4. A filter apparatus as in claim 2 wherein said clamping means comprises a substantially rigid rib extending axially between the innermost portions of each aligned pair of said inwardly extending cogs whereby the grooves between said ridges are formed about ribs.

5. A filter apparatus as in claim 1 wherein said members are generally cylindrical, identical and allochirally arranged so that, when said filter element is clamped thereto, said filter element will assume a corrugated condition with axially extending ridges and grooves, the contour of each ridge being determined by the contour of the outwardly extending cogs about which the ridge is formed and the contour of each groove being determined by the contour of the inwardly extending cogs about which the groove is formed, a substantially rigid post extending axially between each aligned pair of said outwardly extending cogs and within the contour of the ridge formed about said outwardly extending cogs, the radially outer edge of each post being substantially coincident with the tips of the cogs between which the post extends, and a substantially rigid rib extending axially between each aligned pair of inwardly extending cogs, the radially inner edge of each rib being substantially coincident with the tips of the cogs between which the rib extends.

6. A filter apparatus as in claim 5 wherein each clamping head is arranged to be wrapped peripherally about one of said members, each clamping head comprising a plurality of segments providing said inwardly extending cogs, and means hingedly connecting adjacent segments whereby said clamping heads can be closed to engage peripherally said members and opened to disengage said members.

7. A filter apparatus as in claim 6 further comprising resilient means for holding said clamping heads in their closed position.

8. A filter apparatus as in claim 7 wherein said resilient means comprises annual means peripherally engaging each clamping head.

9. A filter apparatus as in claim 8 wherein each segment is formed with a radially outwardly extending portion and wherein each of said annular means engages the extending portions of its associated clamping head whereby said annular means is disposed radially outwardly of the means for hingedly connecting the segments of said clamping head.

10. A filter apparatus as in claim 9 wherein said extending portions are provided with peripherally extending grooves for receiving said annular means.

11. A filter apparatus as in claim 6 wherein said means for hingedly connecting adjacent segments comprises flexible strap means connected between adjacent segments.

12. A filter apparatus as in claim 6 wherein said means for hingedly connecting adjacent segments comprises an axially extending pin mounted on each of certain segments and extending through an elongated slot in an adjacent segment whereby said adjacent segment is movable pivotally about the axis of said pin and, within the boundary of its elongated slot, transversely relative to the axis of said pin.

13. A filter apparatus as in claim 1 wherein each clamping head comprises a plurality of segments and means for hingedly connecting adjacent segments whereby said clamping heads can be closed peripherally to engage said members and opened to disengage said members.

14. A filter apparatus as in claim 13 further comprising resilient means for holding said clamping heads in their closed positions.

15. A filter apparatus as in claim 1 wherein each clamping head is an integral structure comprising a plurality of relatively movable segments and flexible web portions hingedly connecting said segments whereby said clamping heads can be wrapped perimetrally about said members to engage said filter element.

16. A filter apparatus as in claim 14 wherein said members are generally cylindrical, each of said members having a peripherally extending groove formed in its outer surface, and each of said clamping heads providing a peripherally and radially inwardly extending tenon proportioned and designed to extend into one of said grooves whereby each clamping head is restrained against axial movement relative to its associated member.

17. A filter apparatus as in claim 14 wherein said members are generally cylindrical, each of said members providing a peripherally and radially outwardly extending tenon and each of said clamping heads providing a peripherally extending groove proportioned and designed to receive one of said tenons, whereby each clamping head is restrained against axial movement relative to its associated member.

18. A filter apparatus as in claim 1 further comprising, at each end of said filter element, gasket means disposed between said inwardly and outwardly extending cogs, each of said gasket means comprising an inner gasket portion engaging the contour of said outwardly extending cogs and an outer gasket portion engaging the contour of said inwardly extending cogs.

19. A filter apparatus as in claim 18 wherein said inner and outer gaskets are rubberoid elements intimately bonded to said filter element.

20. A filter apparatus as in claim 1 further comprising a rubberoid material impregnating each perimetral end portion of said filter element, said rubberoid material being effective to facilitate the engagement of said filter element by said inwardly and outwardly extending cogs.

21. A filter apparatus as in claim 14 wherein said members are generally cylindrical, each of said members having an axially outwardly extending annular collar portion, each collar portion being formed to provide sockets aligned with the spaces between said outwardly extending cogs, each of said inwardly extending cogs having an axially extending portion proportioned and arranged for reception in one of said sockets, the outer surfaces of said last-mentioned portions of each clamping head lying when said clamping heads are in their closed positions, substantially in common cylindrical surface, and wherein said resilient means for each clamping head comprises a resilient annulus peripherally engaging all of said outer surfaces of said last-mentioned portions.

References Cited

FOREIGN PATENTS 562,203  6/1944  Great Britain.

REUBEN FRIEDMAN, Primary Examiner

T. A. GRANGER, Assistant Examiner

U.S. Cl. X.R.

55—498, 500, 501, 521; 210—493.

UNITED STATES PATENT OFFICE
CERTIFICATE OF CORRECTION

Patent No. 3,486,626      Dated December 30, 1969

Inventor(s) Sam Close

It is certified that error appears in the above-identified patent and that said Letters Patent are hereby corrected as shown below:

Column 2, line 46, after "each" and before "of" insert -- end --.
Column 4, line 57, -- resilient -- is misspelled; same column, line 58, after "about" and before "core" insert -- the --.
Column 5, line 26, after "40c," and before "42a," insert -- 40d, --; same column, line 49, after "the" (first occurrence) and before "manner" insert -- same --.
Column 7, line 18 (Claim 12, line 3) after "certain" and before "seg-", insert -- of said --; same column, line 36 (Claim 15, line 4) after "segments" insert a comma.
Column 8, line 33, (Claim 21, line 11), after "in" and before "common" insert -- a --.

SIGNED AND SEALED
JUN 23 1970

(SEAL)
Attest:

Edward M. Fletcher, Jr.
Attesting Officer

WILLIAM E. SCHUYLER, JR.
Commissioner of Patents